Nov. 30, 1948.　　　P. KAUFMAN ET AL　　　2,454,969
FOOTREST AND PEDAL EXTENSION
Filed Oct. 7, 1946
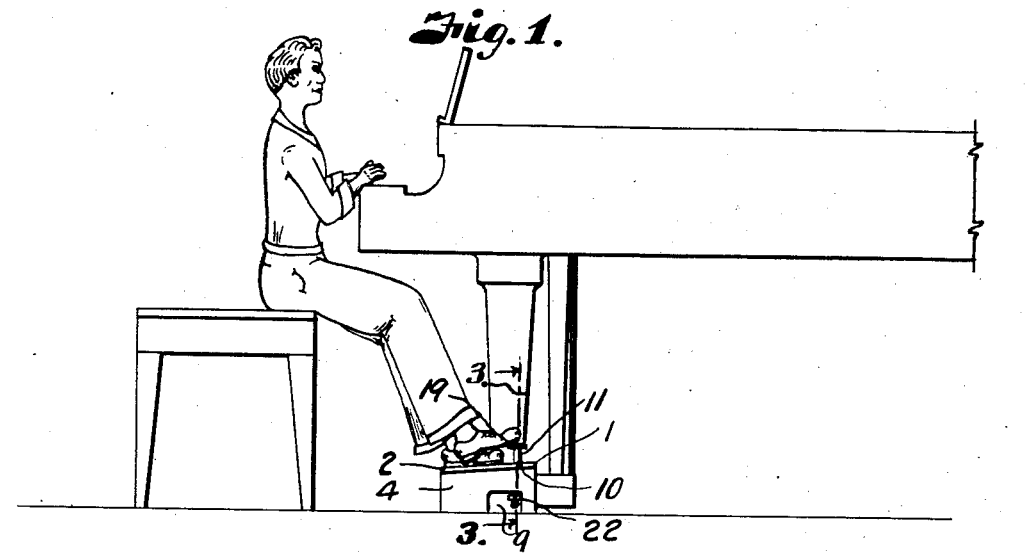
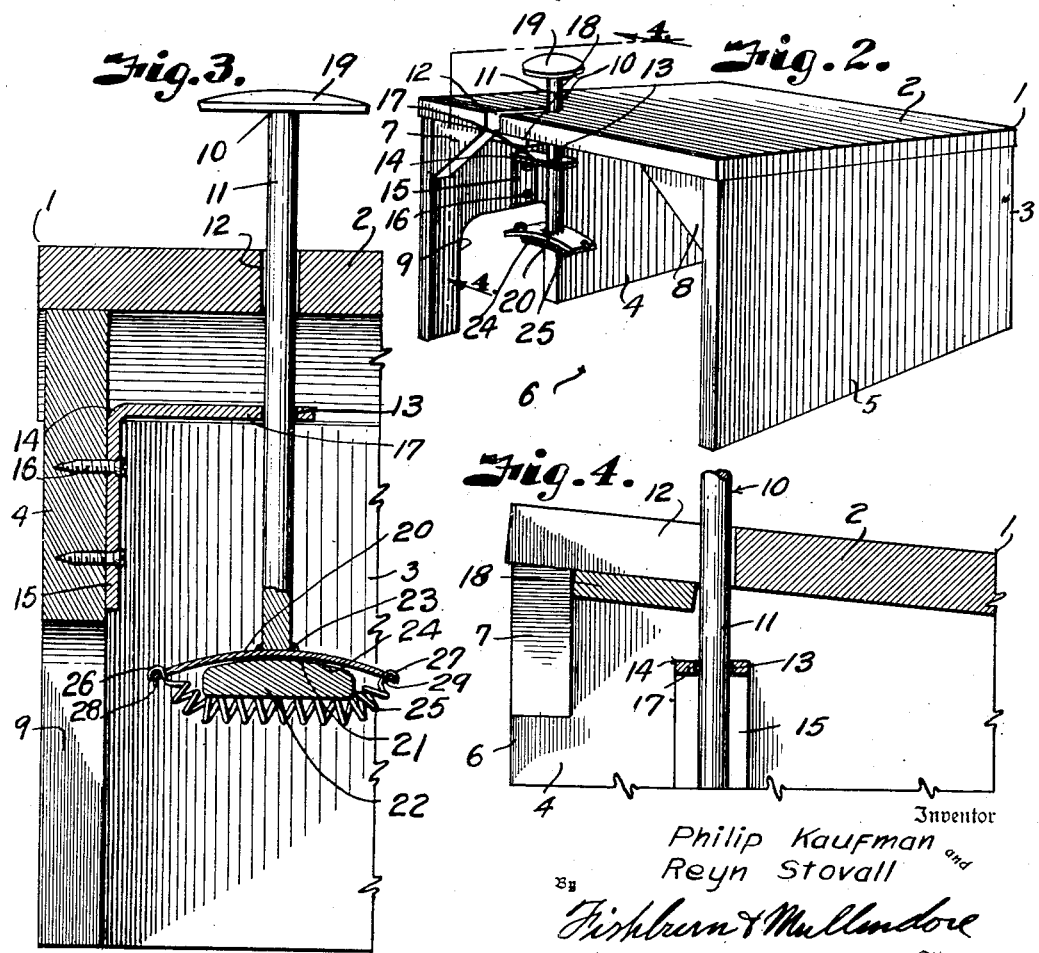
Inventor
Philip Kaufman and
Reyn Stovall
By Fishburn & Mullendore
Attorneys Patented Nov. 30, 1948

2,454,969

UNITED STATES PATENT OFFICE 2,454,969

FOOTREST AND PEDAL EXTENSION

Philip Kaufman and Reyn Stovall, Kansas City, Mo.

Application October 7, 1946, Serial No. 701,770

3 Claims. (Cl. 84—232)

1

This invention relates to a footrest and pedal extension to permit use by children of the pedal action of a piano.

Various devices have been provided for this purpose prior to the present invention, but they have not been satisfactory because of the difficulty and time required in connecting the pedal extension with the pedal of a piano, particularly when used in recitals and in studios by teachers instructing both adults and children.

The purpose of the present invention is to provide a footrest equipped with a pedal extension that is readily connected with the pedal of a piano incidental to placing of the rest in position and which is readily detached incidental to removal of the footrest.

Other objects of the invention are to provide a footrest with a pedal attachment that is of simple and inexpensive construction and which may be sold at relatively low cost.

In accomplishing these and other objects of the invention hereinafter pointed out, we have provided improved structure, the preferred form of which is illustrated in the accompanying drawings wherein:

Fig. 1 is a side elevational view of a piano showing use of a footrest and pedal attachment embodying the features of the present invention.

Fig. 2 is an enlarged perspective view of the footrest and pedal extension.

Fig. 3 is an enlarged section through the footrest and pedal extension on the line 3—3 of Fig. 1, particularly illustrating the connection between the pedal of the piano and the pedal extension.

Fig. 4 is a fragmentary section on the line 4—4 of Fig. 2.

Referring more in detail to the drawing:

1 designates a footrest and pedal extension embodying the features of the present invention and which includes a substantially flat top member 2 having support on front and side members 3, 4 and 5 respectively. The front and side members are of sufficient height to support the front portion of the top 2 in convenient position so a child may rest the feet thereon when seated at a piano. The sides 4 and 5 preferably increase in height from the front to the rear to support the top 2 at a slight incline as best shown in Figs. 1, 2 and 4. The rear side of the footrest is open as indicated at 6 to accommodate the pedals of a piano therein. The sides 4 and 5 are preferably braced with the top 2 by means of brackets 7 and 8 as best shown in Fig. 2. The side 4, adjacent to the "loud" pedal, is provided with a notch-like opening 9 extending upwardly

2 from the lower edge of the side member and which terminates somewhat above the upper plane of the pedals. The opening is of a width to insert the fingers therethrough in guiding the rest relative to the pedals as later described.

The footrest carries a pedal extension 10 that is located in registry with the "loud" or right-hand pedal and which includes a rod-like stem 11 reciprocably supported in a notch-like slot 12 formed in the top 2 and in a bearing opening 13 of an angle-shaped bracket 14 that has one leg 15 attached to the inner face of the side wall above the notch-like opening 9 by fastening devices such as screws 16. The upper arm 17 of the bracket is thus spaced below the top and extends in a position so that the bearing opening therein registers with the front end notch 12 to support the pedal in extension in proper alignment. The front of the notch 12 is closed by a cleat 18 that is attached to the underside of the top transversely of the open end of the notch as shown in Fig. 4. The upper end of the rod-like stem 11 carries a head 19 adapted to be engaged by the foot when the heel of the foot is supported on the top 2 as shown in Fig. 1. The lower end of the rod-like stem carries a substantially arcuate-shaped head or cross member 20 preferably formed of sheet metal of sufficient gauge to retain its arcuate shape and which corresponds to the upper face 21 of the piano pedal indicated at 22 (Fig. 3). The member 20 is attached to the rod-like stem 11 by welding or the like as indicated at 23 so that the concave side 24 faces downwardly and in a position to extend transversely across the face of the pedal.

In order to insure anchorage of the pedal extension to the pedal, the member 20 carries a pedal clamping member 25 adapted to resiliently engage the underside of the pedal. The member 25 preferably is in the form of a coil spring having hooks 26 and 27 on its respective ends and which are engaged in suitable apertures 28 and 29 formed in the ends of the member 20 as shown in Fig. 3.

The coil spring in cooperation with the arcuate-shaped member provides a simple and secure connection between the pedal and pedal extension and is readily manipulated to cause the pedal to pass between the arcuate member and spring when the rest is placed in position.

In assembling the pedal extension the rod-like stem 11 is passed through the bearing opening 13 of the bracket 14 prior to application of the bracket 14. The arcuate member 20 is then welded to the end of the stem and the coil spring 25 is attached by hooking the ends 26 and 27 thereof into the apertures 28 and 29 at the ends of the arcuate member 20 so that the spring extends across the concave face of the member 20 leaving an open space therebetween through which the pedal is to be projected. The length of the arcuate member is such that the space between the coils of spring and concave face is less than the thickness of a piano pedal at the point where the member 20 engages the pedal to cause clamping of the arcuate member. The rod-like stem 11 is then passed through the slot 12 and the open side of the slot is closed by the cleat 18 as shown in Fig. 4. The bracket is then attached to the side 4 by inserting the fastening device 16 to complete the assembly.

In applying the rest, the rest is merely placed in position in front of the pedals so that the pedal extension is in registry with the right-hand pedal. The fingers of the hand are then inserted through the notch-like opening 9 and the pedal extension is lifted so that the opening formed between the spring and the lower face of the arcuate member 20 is at the same elevation as the pedal. The entire rest is then slid retractively into position, the member 20 passing over the top of the pedal and the spring on the underside of the pedal as shown in Fig. 3. The spring being of circular cross section, facilitates passage thereof under the pedal when the rest is being moved into position. The spring provides sufficient action to cooperate with the arcuate member 20 in gripping the pedal therebetween to maintain the connection. The pedal extension is supported by the pedal and is kept in position so that it is readily responsive to pressure applied by the foot of a child pianist.

When the device is to be removed, it is simply withdrawn and the member 20 and spring 24 slide off the end of the pedal.

From the foregoing it is obvious that we have provided a footrest and pedal extension that is readily connected with the pedal of a piano so that no time is lost in making connection or disconnecting the pedal extension with the pedal of a piano. Consequently, the device is especially adapted for use by children at recitals or studios that give lessons to children and adults which necessitates frequent removal and placement of the footrest.

What we claim and desire to secure by Letters Patent is:

1. In a device of the character described, a footrest having a top supported by front and side walls with one of the side walls provided with an opening for providing access to a pedal of a piano, said top having an opening, a bracket having a bearing opening, means for attaching the bracket to said rest with the bearing opening registering with the opening in said top, a stem slidably supported in said openings, a foot-engaging head on said projecting end of the stem, a pedal engaging head on the other end of said stem adapted to extend transversely across the pedal, and a coil spring adapted to engage the underside of the pedal and having ends connected with ends of said pedal engaging head for frictionally gripping the pedal therebetween.

2. In a device of the character described, a footrest having a top supported by front and side walls and an open back to pass the footrest over the pedals of a piano, said top having an opening, a bracket having a bearing opening, means for attaching the bracket to said rest with the bearing opening registering with the opening in said top, a stem slidably supported in said openings and projecting above said top, a foot-engaging head on the projecting end of the stem, a pedal-engaging head on the other end of said rod adapted to extend transversely across the pedal, and a coil spring adapted to engage the underside of the pedal and having ends connected with ends of said pedal-engaging head for frictionally gripping the pedal therebetween.

3. In a device of the character described, a footrest having a top, and means supporting the top over the pedals of a piano, a stem, means reciprocably supporting the stem on said footrest with one end projecting above said top, a foot-engaging head on the projecting end of the stem, a pedal engaging head on the other end of said stem adapted to extend transversely across the pedal, and a coil spring adapted to engage the underside of the pedal and having ends connected with ends of said pedal engaging head for frictionally gripping the pedal therebetween.

PHILIP KAUFMAN.
REYN STOVALL.

REFERENCES CITED

The following references are of record in the file of this patent:

UNITED STATES PATENTS

| Number | Name | Date |
|---|---|---|
| 489,810 | Hobday | Jan. 10, 1893 |
| 1,162,880 | Reinhart | Dec. 7, 1915 |
| 1,483,592 | Pelstring | Feb. 12, 1924 |
| 2,030,929 | Miyashita | Feb. 18, 1936 |

FOREIGN PATENTS

| Number | Country | Date |
|---|---|---|
| 264,752 | Great Britain | Jan. 27, 1927 |